(12) United States Patent
Kadotani et al.

(10) Patent No.: US 9,348,199 B2
(45) Date of Patent: May 24, 2016

(54) OPTICAL DEVICE, PROJECTOR, AND METHOD OF MANUFACTURING OPTICAL DEVICE

(71) Applicant: Seiko Epson Corporation, Tokyo (JP)

(72) Inventors: Masato Kadotani, Matsumoto (JP); Fumihide Sasaki, Azumino (JP); Yoshiyuki Kakisaka, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 213 days.

(21) Appl. No.: 13/955,165

(22) Filed: Jul. 31, 2013

(65) Prior Publication Data
US 2014/0036237 A1 Feb. 6, 2014

(30) Foreign Application Priority Data

Aug. 6, 2012 (JP) ................................. 2012-173753

(51) Int. Cl.
G02F 1/1333 (2006.01)
G03B 21/14 (2006.01)
H04N 9/31 (2006.01)

(52) U.S. Cl.
CPC .............. *G03B 21/142* (2013.01); *G03B 21/14* (2013.01); *H04N 9/317* (2013.01); *G02F 1/133308* (2013.01); *Y10T 29/49826* (2015.01)

(58) Field of Classification Search
CPC ...... G03B 21/14; G03B 21/16; G03B 21/145; H04N 98/3144; H04N 9/3141; H04N 9/3105; G02F 1/133308

USPC ...................................................... 349/58, 60
See application file for complete search history.

(56) References Cited

U.S. PATENT DOCUMENTS

| | | | | |
|---|---|---|---|---|
| 6,587,167 | B1* | 7/2003 | Fujimori et al. .................. | 349/58 |
| 2007/0121079 | A1* | 5/2007 | Kitabayashi et al. ........... | 353/31 |
| 2013/0002971 | A1 | 1/2013 | Kadotani et al. | |

FOREIGN PATENT DOCUMENTS

| | | |
|---|---|---|
| CN | 102854716 A | 1/2013 |
| JP | 2008225168 A * | 9/2008 |
| JP | 2009-210779 A | 9/2009 |

* cited by examiner

*Primary Examiner* — William C Dowling
*Assistant Examiner* — Ryan Howard
(74) *Attorney, Agent, or Firm* — ALG Intellectual Property, LLC

(57) ABSTRACT

An optical device includes a plurality of light modulators modulating a plurality of incident color lights with respect to each color light, a light combining optical unit having a plurality of light incident surfaces that the plurality of modulated color lights respectively enter, and combining the plurality of entering color lights, a holding part holding the light modulator, and a supporting part loosely fitting and supporting the holding part, and disposed in a location facing the light incident surface of the light combining optical unit, wherein the supporting part has an extending part extending in a direction away from the light incident surface, and a locking part having a first slope is provided in an end part in an extension direction of the extending part.

15 Claims, 8 Drawing Sheets

OPTICAL DEVICE, PROJECTOR, AND METHOD OF MANUFACTURING OPTICAL DEVICE

BACKGROUND

1. Technical Field

The present invention relates to an optical device, a projector, and a method of manufacturing the optical device.

2. Related Art

In related art, a projector including a plurality of light modulators that modulate a plurality of color lights with respect to each color light, a light combining optical unit that combines the color lights modulated in the respective light modulators, and a projection lens that projects light combined in the light combining optical unit has been known. Further, a structure for supporting the light modulators has been proposed (for example, see Patent Document 1 (JP-A-2009-210779)).

The projector described in Patent Document 1 includes an optical device main body, and the optical device main body has light modulators, an exiting side polarizer, a plate-like member, a cross dichroic prism (light combining optical unit), a first supporting member, a second supporting member, etc.

The first supporting member is a metal member and the light modulators are fixed to the first supporting member using an adhesive, screws, or the like. Further, insertion holes having nearly rectangular shapes are formed in four corners of the first supporting member. The second supporting member is formed using a metal member and projects from a part formed in a rectangular frame shape, and has pins to be inserted into the insertion holes of the first supporting member provided thereon.

Furthermore, the first supporting member is fixed to the second supporting member by application of an adhesive or the like between the insertion holes and the pins, and the second supporting member is fixed to the cross dichroic prism via the plate-like member using an adhesive or the like.

Patent Document 1 does not describe a method of adjusting the locations of the light modulators, however, it is considered that the light modulator and the first supporting member are grasped by a jig and their locations are adjusted because a shape engaged or grasped by an adjustment jig is not formed in the second supporting member. Then, it is considered that, after the adjustment, the adhesives applied between the first supporting member and the second supporting member and between the second supporting member and the plate-like member are cured, and thereby, the locations of the light modulators are determined.

However, in the method, after the adhesives are cured, when the grasping of the light modulators and the first supporting member by the jig is released, the locations of the light modulators can be shifted in response to the release of the pressing force from the jig, i.e., pixels can be shifted. Particularly, in light modulators having high-definition pixels, even when the location shift is slight, the projected image is deteriorated.

SUMMARY

An advantage of some aspects of the invention is to solve at least a part of the problems described above, and the invention can be implemented as the following forms or application examples.

Application Example 1

An optical device according to this application example includes a plurality of light modulators modulating a plurality of incident color lights with respect to each color light, a light combining optical unit having a plurality of light incident surfaces that the plurality of modulated color lights respectively enter, and combining the plurality of entering color lights, a holding part holding the light modulator, and a supporting part loosely fitting and supporting the holding part, and disposed in a location facing the light incident surface of the light combining optical unit, wherein the supporting part has an extending part extending in a direction away from the light incident surface, and a locking part having a first slope is provided in an end part in an extension direction of the extending part.

According to the configuration, the optical device has the holding part and the supporting part formed as described above, and thus, a first jig for holding the holding part and a second jig that can be engaged with the locking part of the supporting part is prepared and these jigs are adapted to move in predetermined directions, thereby, the location of the light modulator may be adjusted at two steps. That is, the first jig grasping the holding part is moved while the second jig is engaged with the locking part and thereby, the location of the holding part loosely fitted and supported by the supporting part is adjusted (first adjustment), and then, the holding part is fixed to the supporting part with an adhesive or the like. Then, the first jig is released from the holding part and the second jig is moved, and thereby, the adjustment in the directions in which the adjustment of the light modulator has not been completed in the first step and readjustment of location shift when the grasping of the first jig with respect to the holding part is released may be performed (second adjustment) and then the supporting part may be attached to the light combining optical unit with an adhesive or the like.

Further, the locking part is formed in a simple shape having the first slope in the end part in the extension direction of the extending part. Thereby, a shape that is engaged with the edge of the first slope is also provided in the second jig, and the second jig may be easily engaged with the locking part.

Therefore, according to the configuration, the optical device that may adjust the locations of the light modulators with respect to the light combining optical unit and the locations of the plurality of light modulators with respect to one another with high accuracy, i.e., may suppress the pixel shift while realizing the simple configuration and downsizing may be provided.

Application Example 2

In the optical device according to the application example, it is preferable that the extending part is provided at a side of the light modulator, and at least a part of the locking part is located nearer a light incident side than the light modulator.

According to the configuration, the extending part is formed as described above, and thus, the locking part with which the second jig may be engaged may be formed even when the distance between the extending part and the light modulator is made smaller. Thereby, the size of the unit having the light modulator, the holding part, and the supporting part on the side may be downsized. That is, the spaces between the respective units provided with respect to each of the plurality of color lights may be secured.

Application Example 3

In the optical device according to the application example, it is preferable that the extending part includes two extending parts provided in locations corresponding to both sides of the light modulator, and the locking parts are respectively provided in the two extending parts.

According to the configuration, the locking parts are provided on both sides of the light modulator, and thus, the supporting part may be stably locked by the second jig. Therefore, the work using the second jig may be efficiently performed.

Application Example 4

In the optical device according to the application example, it is preferable that the locking part has a second slope extending in a direction intersecting with an extension direction of the first slope in a location facing the first slope, and the locking part is a groove having the first slope and the second slope.

According to the configuration, the locking part is a V-shaped groove, and the first slope and the second slope may be formed in the smaller spaces with high accuracy.

Application Example 5

A projector according to this application example includes a light source, the above described optical device, and a projection lens that projects light combined in the optical device.

According to the configuration, the projector includes the above described optical device, and thus, the plurality of light modulators may be arranged with high accuracy and images with suppressed image shift may be projected.

Further, the spaces between the respective units are secured, and the following advantages may be obtained. Even when an impact is applied to the projector due to drop or the like, the interference between the units is suppressed, and thus, the projector with improved impact resistance may be provided. Furthermore, the degree of freedom of channel formation for cooling air for cooling the light modulators etc. or the like becomes greater, and thus, the light modulators etc. may be efficiently cooled.

Application Example 6

A method of manufacturing the optical device according to this application example includes: engaging a second jig with the locking part under a condition that the holding part loosely fitted and supported by the supporting part is grasped by a first jig, adjusting a location of the light modulator held by the holding part by moving the first jig, fixing the holding part to the supporting part, adjusting the location of the light modulator by releasing the grasping of the first jig with respect to the holding part and moving the second jig, and fixing the supporting part to the light combining optical unit.

According to the configuration, the location of the light modulator may be adjusted at two steps, and thus, the adjustment in the directions in which the adjustment has not been completed at the former adjusting and readjustment of location shift when the grasping of the first jig with respect to the holding part is released may be performed at the latter adjusting. Therefore, the good optical device with suppressed pixel shift may be manufactured.

BRIEF DESCRIPTION OF THE DRAWINGS

The invention will be described with reference to the accompanying drawings, wherein like numbers reference like elements.

DESCRIPTION OF EXEMPLARY EMBODIMENTS

As below, a projector according to an embodiment will be explained with reference to the drawings. The projector of the embodiment modulates luminous flux output from a light source in response to image information and enlarges and projects it onto a screen or the like.

Figure 1:
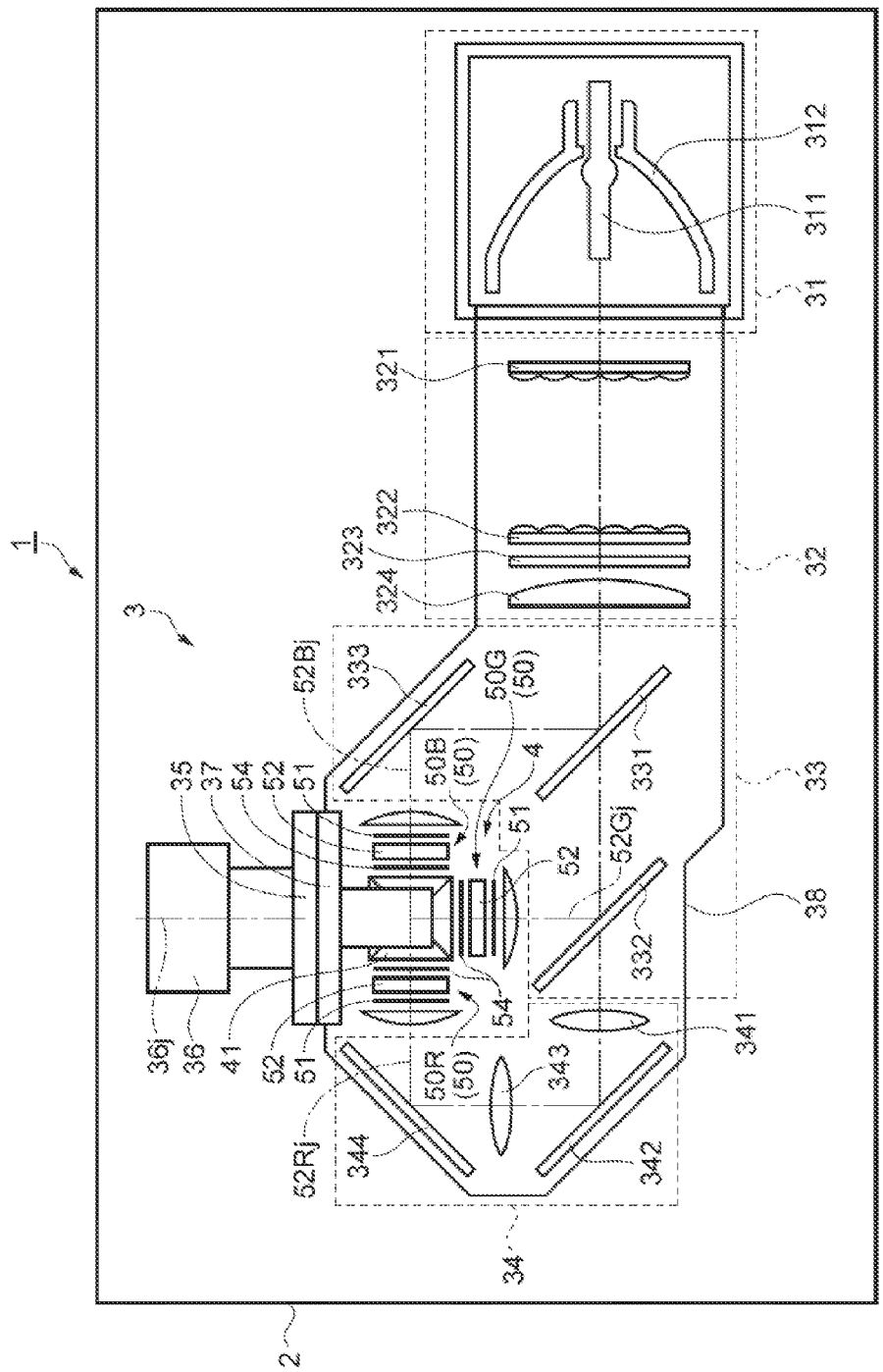
FIG. 1 is a schematic diagram showing an overall configuration of a projector of an embodiment.

FIG. 1 is a schematic diagram showing an overall configuration of the projector 1 of the embodiment.

As shown in FIG. 1, the projector 1 includes an exterior casing 2 that forms an exterior, a control unit (not shown), and an optical unit 3 having a light source device 31. Note that, though not illustrated, a power supply unit that supplies electric power to the light source device 31 and the control unit, a cooling device that cools the optical unit 3, etc. are further provided inside of the exterior casing 2.

The exterior casing 2 includes an upper case forming an upper part, a lower case forming a lower part, etc. though their detailed explanation is omitted. Further, in the exterior casing 2, an intake port for taking in outside air, an exhaust port for exhausting the warm air inside of the exterior casing 2 to the outside, etc. are provided.

The control unit includes a CPU (Central Processing Unit), a ROM (Read Only Memory), a RAM (Random Access Memory), etc. and functions as a computer, and performs control of the operation of the projector 1, for example, control with respect to image projection or the like.

Configuration of Optical Unit

The optical unit 3 optically processes and projects the luminous flux output from the light source device 31 under the control by the control unit.

As shown in FIG. 1, the optical unit 3 includes an optical integrating illumination system 32, a color separation system 33, a relay system 34, an optical device 4, a head body 37 (see FIG. 3), a lens shift mechanism 35, a projection lens 36, and an optical component casing 38 for arrangement of these members in predetermined locations in optical paths in addition to the optical device 31.

The optical unit 3 is formed in a nearly L-shape in a plan view as shown in FIG. 1, and the optical device 31 is detachably provided in one end part and the projection lens 36 is provided in the other end part. Note that, as below, for convenience of explanation, the direction in which luminous flux is output from the projection lens 36 is referred to as "front side" and the upside in the installation position in which the projector 1 is installed on a desk or the like is referred to "upside".

The optical device 31 includes a discharge light source 311 having an ultrahigh pressure mercury lamp, a metal halide lamp, or the like, a reflector 312, etc., and reflects luminous flux output from the light source 311 with the reflector 312 and outputs it toward the optical integrating illumination system 32.

The optical integrating illumination system 32 includes a first lens array 321, a second lens array 322, a polarization conversion element 323, and a superimposing lens 324, and is adapted so that the luminous flux output from the optical device 31 may be applied to surfaces of liquid crystal light valves 52, which will be described later, nearly uniformly and may be effectively used.

The color separation system 33 includes two dichroic mirrors 331, 332 and a reflection mirror 333, and has a function of separating the luminous flux output from the optical integrating illumination system 32 into color lights of three colors of red light (hereinafter, referred to as "R-light"), green light (hereinafter, referred to as "G-light"), and blue light (hereinafter, referred to as "B-light").

The relay system 34 includes an incident side lens 341, a relay lens 343, and reflection mirrors 342, 344, and has a function of guiding the R light separated by the color separation system 33 to the light valve 52 for R-light. Note that the optical unit 3 has the configuration in which the relay system 34 guides the R-light, but may have a configuration of guiding the B-light, for example, without limitation.

Figure 2:
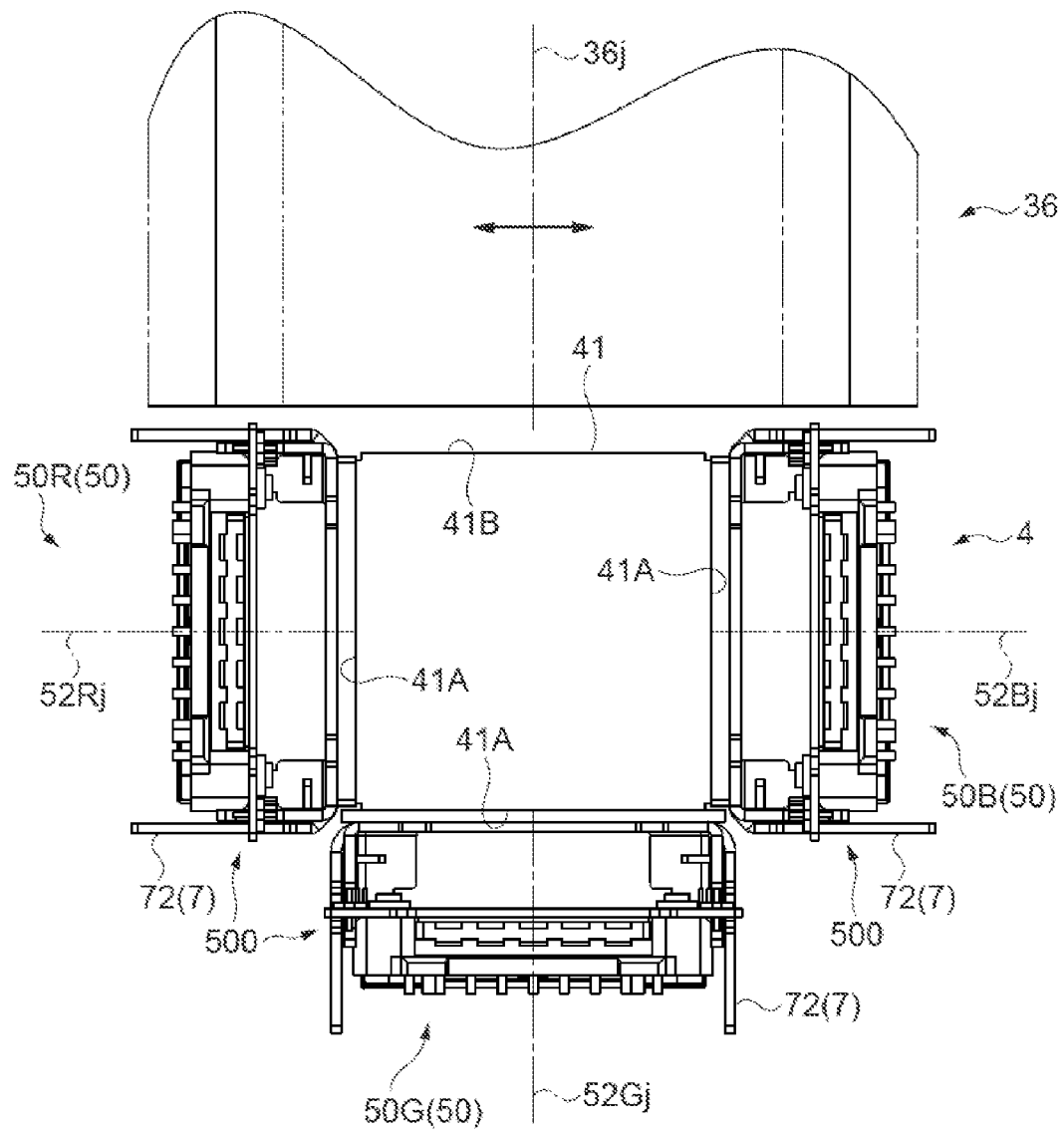
FIG. 2 is a plan view showing a part of an optical device and a projection lens.

FIG. 2 is a plan view showing a part of the optical device 4 and the projection lens 36.

As shown in FIGS. 1 and 2, the optical device 4 includes electrooptical devices 50 provided for the respective color lights (50R denotes the electrooptical device for R-light, 50G denotes the electrooptical device for G-light, and 50B denotes the electrooptical device for B-light) and a cross dichroic prism 41 as a light combining optical unit.

Figure 3:
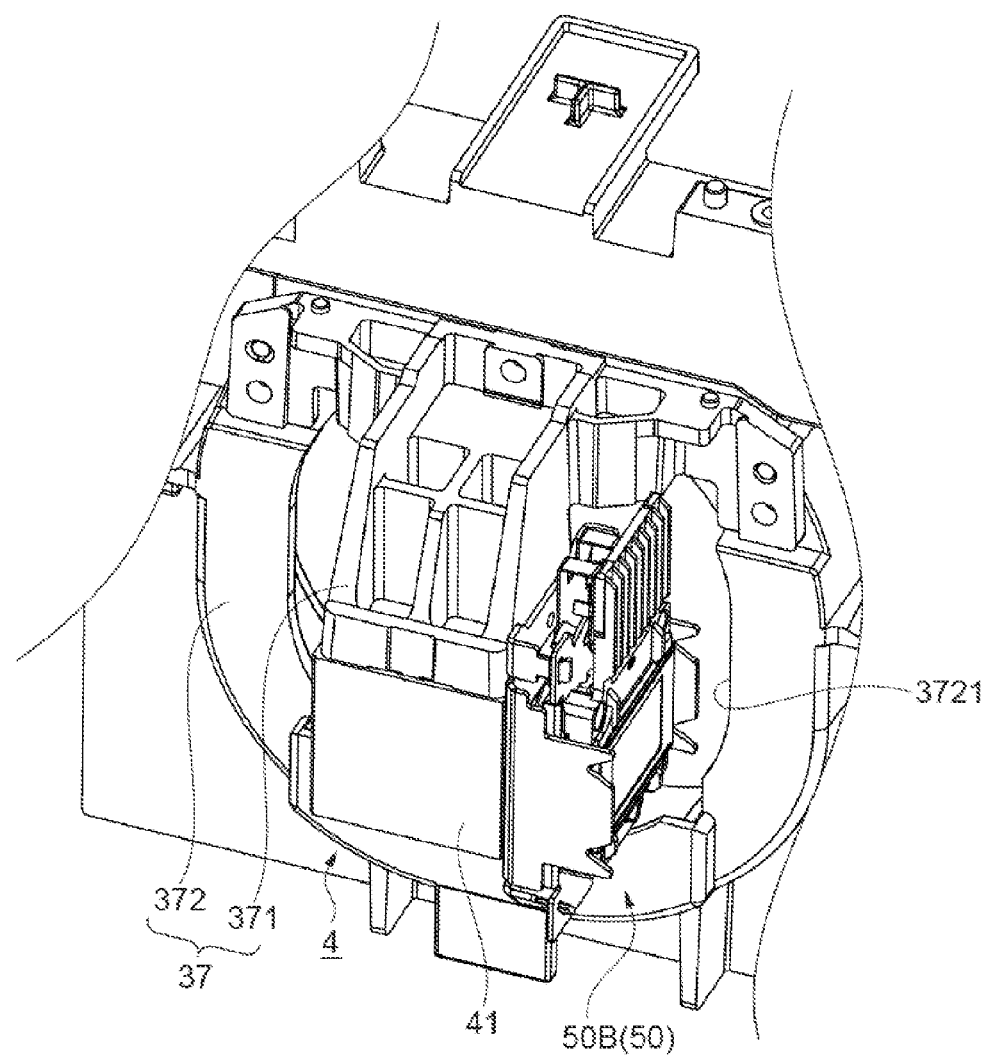
FIG. 3 is a perspective view showing a part of the optical device and a head body.
Figure 4:
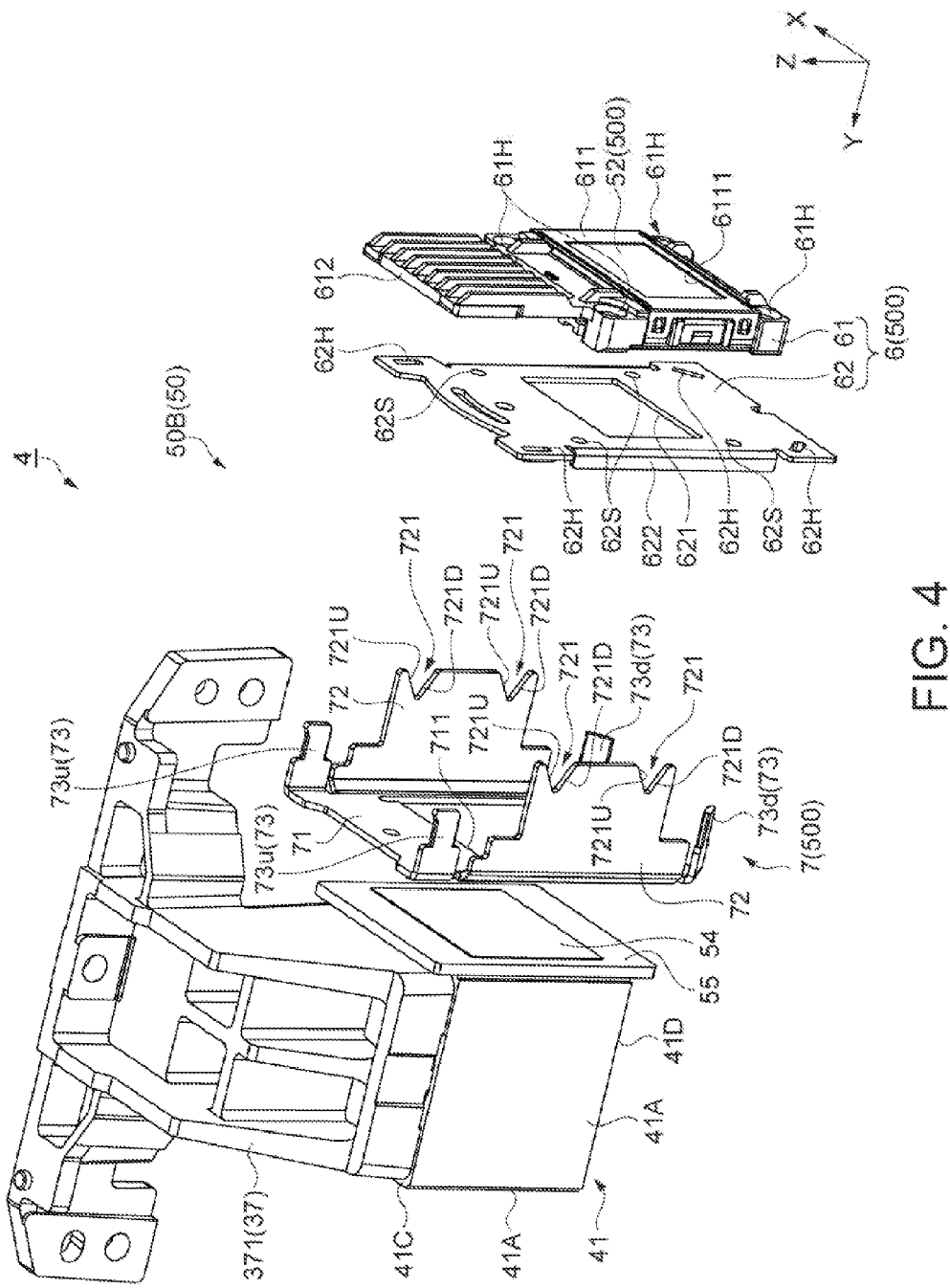
FIG. 4 is an exploded perspective view showing a part of the optical device and the head body.

FIG. 3 is a perspective view showing the optical device 4 and the head body 37, in which the electrooptical devices 50R, 50G are omitted. FIG. 4 is an exploded perspective view showing a part of the optical device 4 and the head body 37, in which the electrooptical devices 50R, 50G are omitted like FIG. 3.

As shown in FIGS. 1 to 4, each electrooptical device 50 includes an incident side polarizer 51, the liquid crystal light valve 52 as a light modulator, an exiting side polarizer 54, a light transmission substrate 55, a holding part 6, and a supporting part 7.

The incident side polarizer 51 transmits the polarized light aligned in the polarization conversion element 323 of the respective color lights separated by the color separation system 33 and absorbs the polarized light different from that polarized light, and outputs the light to the liquid crystal light valve 52. The incident side polarizer 51 is attached to a glass plate and provided in the optical component casing 38.

The liquid crystal light valve 52 has a configuration in which liquid crystal as an electrooptical material is tightly enclosed between a pair of transparent glass substrates, and a rectangular pixel area in which micro pixels (not shown) are formed in a matrix form is formed thereon. Further, a flexible printed board (not shown) is connected to the upper end part of the liquid crystal light valve 52.

In the liquid crystal light valve 52, the orientation state of the liquid crystal is controlled in response to the drive signal input from the control unit via the flexible printed board, and a display image is formed within the pixel area. Then, the liquid crystal light valve 52 modulates the color light output from the incident side polarizer 51 in response to image information.

The exiting side polarizer 54 has nearly the same function as that of the incident side polarizer 51, transmits the polarized light in a certain direction of the color lights output from the liquid crystal light valve 52 and absorbs the polarized light different from that polarized light, and outputs the light to the cross dichroic prism 41. The exiting side polarizer 54 is formed in a rectangular shape in the plan view and attached to the light transmission substrate 55.

The light transmission substrate 55 is formed in a rectangular shape in the plan view having the size larger than those of a light incident surface 41A of the cross dichroic prism 41 and the exiting side polarizer 54 as shown in FIG. 4 using a plate member having high thermal conductivity such as quartz.

The light transmission substrate 55 to which the exiting side polarizer 54 has been attached is bonded and fixed to the cross dichroic prism 41 on the opposite side to the side to which the exiting side polarizer 54 is attached.

The holding part 6 is formed to hold the liquid crystal light valve 52, and includes a frame 61 and a fixing plate 62 as shown in FIG. 4.

The supporting part 7 is provided at the cross dichroic prism 41 side of the fixing plate 62, and supports the holding part 6. The supporting part 7 is bonded and fixed to the cross dichroic prism 41 via the light transmission substrate 55 after location adjustment of the liquid crystal light valve 52. Note that, as below, in each electrooptical device 50, the liquid crystal light valve 52, the holding part 6, and the supporting part 7 are referred to as "optical device main body 500", and its specific configuration will be explained in detail later.

The cross dichroic prism 41 has a nearly square shape in the plan view formed by bonding four right-angle prisms, and has three light incident surfaces 41A, one light exiting surface 41B, and an upper surface 41C, and a lower surface 41D as shown in FIGS. 2 and 4. On the three light incident surfaces 41A, the respective electrooptical devices 50 are provided to face one another. Further, in the optical device 4, optical axes 52Rj, 52Gj, 52Bj of the liquid crystal light valves 52 for the respective color lights are provided.

Furthermore, in the cross dichroic prism 41, two dielectric multilayer films are formed on the interfaces on which the right-angle prisms are bonded, and the respective color lights entering from the respective light incident surfaces 41A are combined and output from the light exiting surface 41B. Specifically, in the cross dichroic prism 41, the dielectric multilayer films reflect the color lights modulated in the electrooptical devices 50R, 50B, transmit the color light modulated in the electrooptical device 50G, and combines the respective color lights.

The projection lens 36 has a plurality of lenses (not shown) provided along an optical axis 36j, and enlarges and projects the light combined in the cross dichroic prism 41 onto the screen.

Though the detailed drawings are omitted, the lens shift mechanism 35 includes a fixed part and a movable part, and the fixed part is fixed to the head body 37 and the projection lens 36 is attached to the movable part. Further, the lens shift mechanism 35 moves the projection lens 36 in a plane orthogonal to the optical axis 36j as shown in FIG. 2 when the movable part is electrically or manually moved on the fixed part.

The head body 37 supports the optical device 4 and the lens shift mechanism 35, and is attached to the optical component casing 38. As shown in FIG. 3, the head body 37 includes a prism supporting part 371 located on the upside of the cross dichroic prism 41, and a shift supporting part 372 located on the front side of the cross dichroic prism 41. Further, the prism supporting part 371 is fixed with screws to the shift supporting part 372.

The prism supporting part 371 supports the cross dichroic prism 41 when the upper surface 41C of the cross dichroic prism 41 is bonded and fixed thereto.

The shift supporting part 372 supports the lens shift mechanism 35. The shift supporting part 372 has an opening part 3721 through which the luminous flux output from the cross dichroic prism 41 passes. The opening part 3721 is set in a size in which the side that the luminous flux of the projection lens 36 enters may be inserted and the projection lens 36 moved by the lens shift mechanism 35 may be moved in a predetermined range.

Configuration of Optical Device Main Body

Here, the specific configuration of the optical device main body 500 will be explained. The optical device main bodies 500 for three color lights have the same configuration and, here, attention will be focused on the optical device main body 500 for B-light for explanation. Note that, as below, for convenience of explanation, the normal direction of the light incident surface 41A for B-light is referred to as "Y-axis direction", the vertical direction orthogonal to the Y-axis direction is referred to as "Z-axis direction", and the direction orthogonal to the Y-axis direction and the Z-axis direction (horizontal direction) is referred to as "X-axis direction".

As described above and as shown in FIG. 4, the optical device main body 500 includes the liquid crystal light valve 52, the holding part 6, and the supporting part 7, and the holding part 6 includes the frame 61 and the fixing plate 62.

The frame 61 is made of a metal and has a frame part 611 for housing the liquid crystal light valve 52 and a heat dissipation part 612.

As shown in FIG. 4, the frame part 611 is formed in a rectangular shape in the plan view, and an opening part 6111 that the color light separated by the color separation system 33 and transmitted through the incident side polarizer 51 enters is formed in the center part. Further, through holes 61H penetrating in the Y-axis direction are provided in four corners of the frame part 611.

The heat dissipation part 612 projects from the upper end of the frame part 611 and is formed in a rectangular shape in the plan view, and formed along a part of the flexible printed board (not shown).

The fixing plate 62 is provided at the cross dichroic prism 41 side of the frame 61, and the frame 61 housing the liquid crystal light valve 52 is fixed thereto. The fixing plate 62 is formed in a rectangular shape in the plan view from a metal plate material, and an opening part 621 through which the color light transmitted through the liquid crystal light valve 52 passes is provided in the center part. Further, bent parts 622 bent toward the cross dichroic prism 41 side are provided on the right and left of the opening part 621 (FIG. 4 shows one of the bent parts 622). The bent parts 622 are provided, and thereby, the stiffness of the fixing part 62 is improved.

Furthermore, in the fixing plate 62, screw holes 62S are formed near the opening part 621, and insertion holes 62H are formed in four corners.

The screw holes 62S are formed in locations corresponding to the through holes 61H of the frame 61, and the frame 61 housing the liquid crystal light valve 52 is fixed to the fixing plate 62 by screws inserted into the through holes 61H and threaded in the screw holes 62S.

The insertion holes 62H are formed in rectangular shapes in the plan view, and projection parts 73, which will be described later, of the supporting part 7 are inserted into the insertion holes 62H.

The supporting part 7 is processed from a metal plate material, and has a base part 71, extending parts 72 and the projection parts 73 as shown in FIG. 4.

The base part 71 is apart fixed to the cross dichroic prism 41 via the light transmission substrate 55 and having the nearly equal size to that of the light transmission substrate 55, and is formed in a rectangular shape in the plan view. An opening part 711 larger than the outer shape of the exiting side polarizer 54 is formed in the center part of the base part 71.

As shown in FIG. 4, a pair of the extending parts 72 are provided to be bent to nearly 90° from the right and left side end parts of the base part 71 toward the fixing plate 62 side.

Figure 5A:
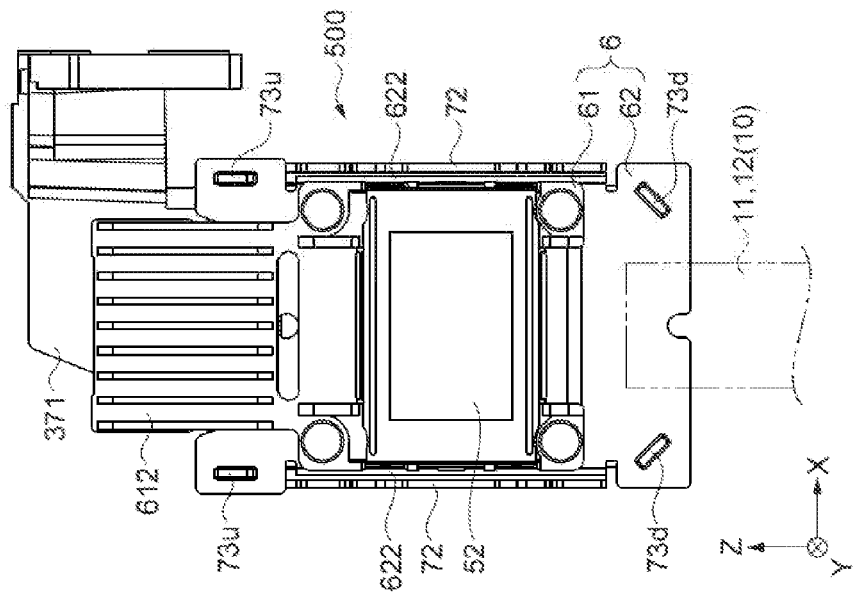
FIGS. 5A and 5B are plan views showing an optical device main body for B light, a cross dichroic prism, and a prism supporting part.
Figure 5B:
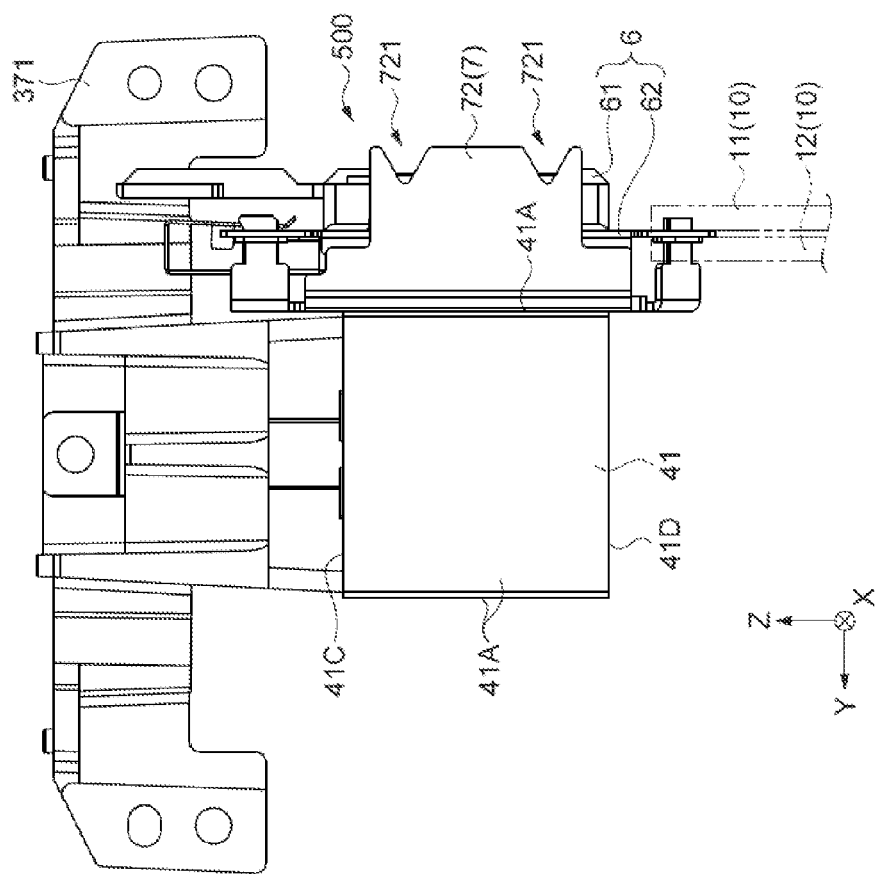

FIGS. 5A and 5B are plan views showing the optical device main body 500 for B-light, the cross dichroic prism 41, and the prism supporting part 371, and FIG. 5A shows the liquid crystal light valve 52 from the front (−Y side) and FIG. 5B shows the liquid crystal light valve 52 from the side (−X side).

The pair of extending parts 72 extend in a direction away from the light incident surface 41A as shown in FIG. 5B, and are provided on the sides of the liquid crystal light valve 52 outside of the bent parts 622 of the fixing plate 62 as shown in FIG. 5A. Further, the pair of extending parts 72 are formed close to the frame 61, and formed in sizes with the ends projecting from the frame 61 toward the light incident side of the frame 61 as shown in FIG. 5B.

In the end parts of the pair of extending parts 72, two grooves 721 are respectively formed. The groove 721 corresponds to a locking part, penetrates along the plate thickness, i.e., in the X-axis direction (horizontal direction), and has a first slope 721U located at the upside and a second slope 721D located at the downside, respectively.

The groove 721 is formed in a V-shape in which the first slope 721U and the second slope 721D intersect in the extension directions and face each other. More specifically, the first slope 721U is formed to be in parallel to the plane passing through the optical axes 52Rj, 52Gj, 52Bj (see FIG. 2) and at an acute angle upward with respect to the plane passing through the point at which the first slope 721U and the second slope 721D intersect in the extension directions (groove center plane). The second slope 721D is formed to be at an acute angle downward with respect to the groove center plane. Further, at least a part of the groove 721 as the locking part projects from the frame 61 toward the light incident side of the frame 61.

As shown in FIGS. 4, 5A, and 5B, the projection parts 73 are formed to be bent to nearly 90° from the four corners of the base part 71 toward the fixing plate 62, and their end parts are inserted into the insertion holes 62H of the fixing plate 62.

The projection parts 73 include a pair of projection parts 73u bent from the upper right and left end parts of the base part 71, and a pair of projection parts 73d bent from the lower right and left end parts of the base part 71.

As shown in FIG. 5A, the pair of projection parts 73u are located at both sides of the heat dissipation part 612 and they are respectively formed nearly in parallel to the extending parts 72. Further, the pair of projection parts 73d are located in the lower part of the frame 61, and they are respectively formed to be at obtuse angles at the frame 61 side with respect to the adjacent extending parts 72.

Further, the projection parts 73u, 73d are formed in sizes to be inserted and loosely fitted into the insertion holes 62H. That is, the projection parts 73u, 73d are formed to have clearances with respect to the insertion holes 62H in the range in which the location of the liquid crystal light valve 52, which will be described later, may be adjusted. Further, the supporting part 7 loosely fits and holds the holding part 6, the insertion holes 62H and the projection parts 73u, 73d are bonded and fixed after the location adjustment to be described later, and thereby, the holding part 6 is fixed to the supporting part 7.

As shown in FIG. 5A, the size of the optical device main body 500 in the horizontal direction is substantially determined by the side end parts of the fixing plate 62 and the extending parts 72 of the supporting part 7. That is, the optical device main body 500 is formed to be compact in the horizontal direction, and has a configuration with ensured sufficient spaces between the respective optical device main bodies 500 and the projection lens 36 moved by the lens shift mechanism 35 as shown in FIG. 2.

Method of Manufacturing Optical Device

Here, a method of manufacturing the optical device 4 will be explained.

Figure 6:
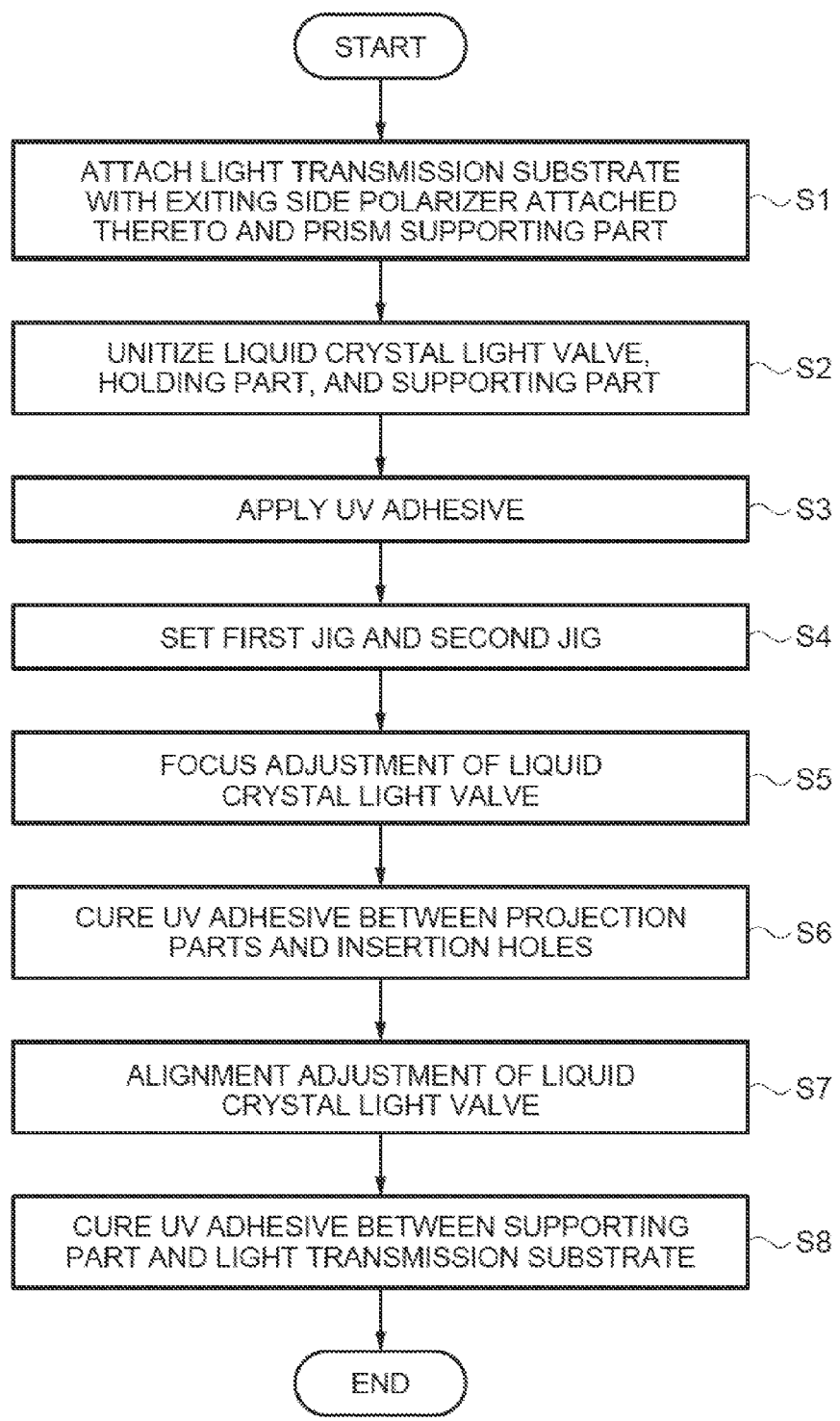
FIG. 6 is a flowchart for explanation of a method of manufacturing the optical device.

FIG. 6 is a flowchart for explanation of the method of manufacturing the optical device 4.

First, the light transmission substrate 55 to which the exiting side polarizer 54 has been attached is attached to each of the three light incident surfaces 41A of the cross dichroic prism 41, and the prism supporting part 371 is attached to the upper surface 41C (step S1: first assembly step).

Then, the liquid crystal light valve 52 is incorporated into the frame 61, and the frame 61 is fixed with screws to the fixing plate 62. Then, the respective projection parts 73 of the supporting part 7 are inserted into the respective insertion holes 62H of the fixing plate 62, and the liquid crystal light valve 52, the holding part 6, and the supporting part 7 are unitized as the optical device main body 500 (step S2: second assembly step).

After step S2, an ultraviolet curable adhesive (UV adhesive) is applied to between the respective projection parts 73 and the respective insertion holes 62H and the surface at the light exit side (cross dichroic prism 41 side) of the base part 71 (step S3: UV adhesive application step). Under the condition that the UV adhesive is applied, the UV adhesive is not cured, and the holding part 6 for holding the liquid crystal light valve 52 is loosely fit and supported by the supporting part 7.

Then, the location adjustment of the liquid crystal light valve 52 is performed using a holding part jig 10 as a first jig and a supporting part jig 20 as a second jig.

Here, the holding part jig 10 and the supporting part jig 20 will be explained with attention focused on the optical device main body 500 including the liquid crystal light valve 52 for B-light.

The holding part jig 10 is adapted to move the holding part 6.

Specifically, the holding part jig 10 includes a pair of grasping parts 11, 12 that can grasp the lower part of the holding part 6 as shown in FIGS. 5A and 5B.

The pair of grasping parts 11, 12 are adapted to be close to and away from each other along the Y-axis, i.e., the optical axis 52Bj of the liquid crystal light valve 52 for B-light.

Further, the grasping parts 11, 12 are adapted to move in the Y-axis direction, in the rotation direction around the X-axis (hereinafter, referred to as "Xθ-direction"), and the rotation direction around the Z-axis (hereinafter, referred to as "Zθ-direction") while grasping the holding part 6.

The supporting part jig 20 is adapted to be engaged with the grooves 721 of the supporting part 7 and move the supporting part 7.

Figure 7A:
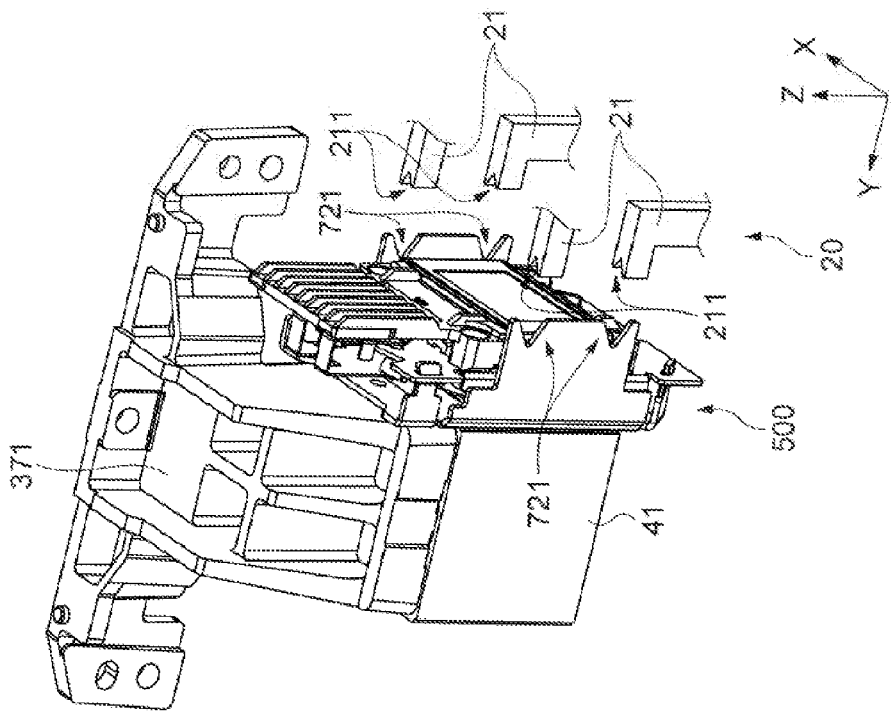
FIGS. 7A and 7B are diagrams for explanation of a supporting part jig.
Figure 7B:
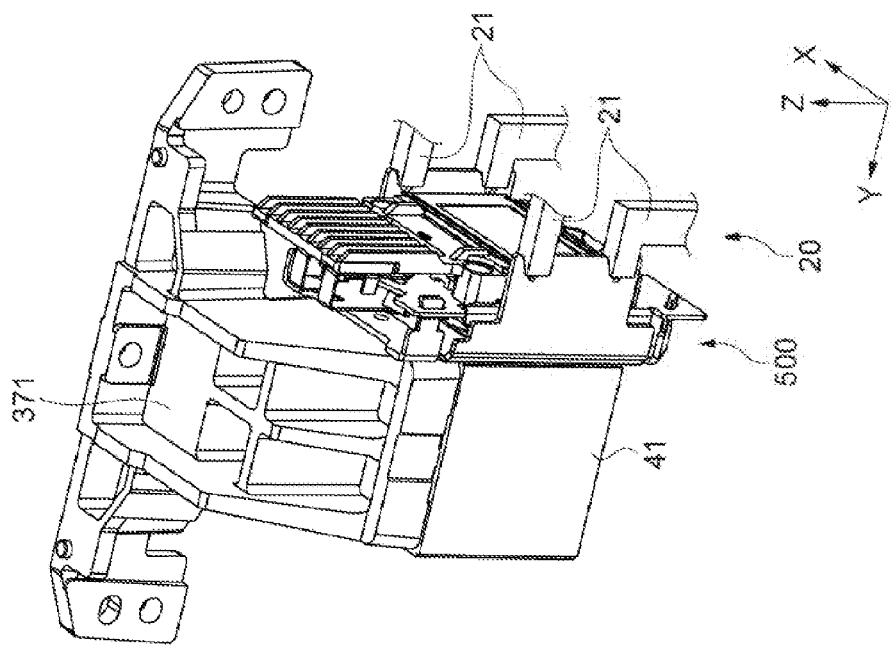

FIGS. 7A and 7B are diagrams for explanation of the supporting part jig 20, and perspective views showing the optical device main body 500 for B-light, the cross dichroic prism 41, the prism supporting part 371, and the supporting part jig 20. Specifically, FIG. 7A shows a state in which the supporting part jig 20 is separated from the grooves 721 and FIG. 7B is a state in which the supporting part jig 20 is engaged with the grooves 721.

As shown in FIGS. 7A and 7B, the supporting part jig 20 includes four arm parts 21 provided in correspondence with the four grooves 721.

The arm part 21 has an end part formed in a rectangular parallelepiped shape and a V-shaped engagement groove 211 that can be engaged with the groove 721 on the end surface of the end part.

The arm part 21 is moved from the location facing the groove 721 of the supporting part 7 in the Y-axis direction as shown in FIG. 7A, and the engagement groove 211 is engaged with the groove 721 as shown in FIG. 7B.

Figure 8A:
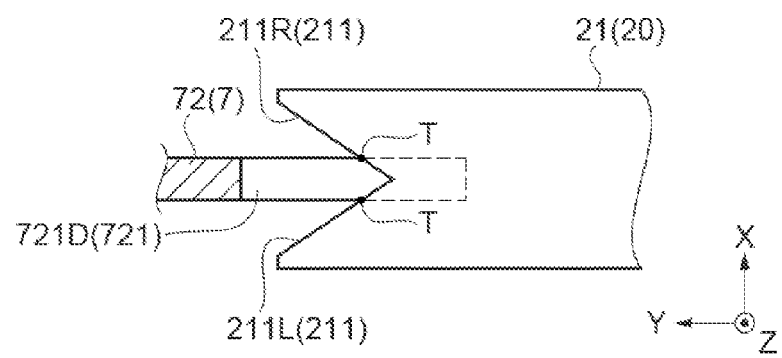
FIGS. 8A and 8B are schematic diagrams showing an engagement groove is engaged with a groove.
Figure 8B:
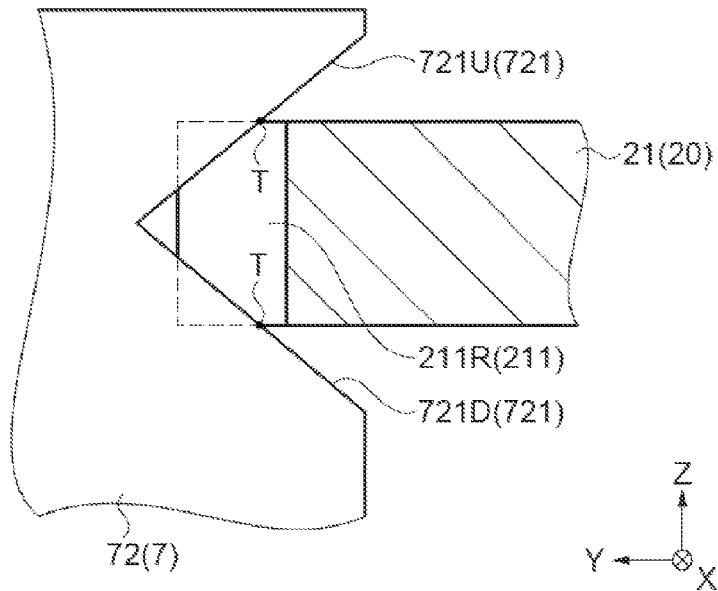

FIGS. 8A and 8B are schematic diagrams showing a state in which the engagement groove 211 is engaged with the groove 721, and FIG. 8A is a view as seen from above and FIG. 8B is a view as seen from the left side (−X side).

As shown in FIGS. 7A to 8B, the engagement groove 211 is formed to penetrate in the Z-axis direction (vertical direction), and has a first receiving surface 211R located at the right side (+X side) and a second receiving surface 211L located at the left side (−X side).

When the groove 721 and the engagement groove 211 are engaged, the groove 721 and the engagement groove 211 are in contact at four points in setting (contact points T in FIGS. 8A and 8B). That is, both edges of the first slope 721U in the groove 721 are in contact with the upper edges of the first receiving surface 211R and the second receiving surface 211L of the engagement groove 211. Further, both edges of the second slope 721D in the groove 721 are in contact with the lower edges of the first receiving surface 211R and the second receiving surface 211L of the engagement groove 211. That is, the supporting part 7 is supported so that the edges of the groove 721 may be sandwiched between the edges of the engagement groove 211. Further, the movement of the supporting part 7 is restricted in the X-axis direction and the Z-axis direction when the engagement groove 211 is engaged with the groove 721.

Even when the dimensions of the supporting part 7, the supporting part jig 20, etc. vary in the tolerance range and one engagement groove 211 is not in contact with the groove 721 at four points, the supporting part 7 is reliably supported by the engagement grooves 211 provided in the four arm parts 21.

Further, the arm parts 21 are adapted to move in the X-axis direction, the Z-axis direction, and the rotation direction around the Y-axis (hereinafter, referred to as "Yθ-direction") while supporting the supporting part 7. That is, the supporting part 7 supported by the arm parts 21 moves to follow the supporting part jig 20 when the arm parts 21 are moved in the X-axis direction and the Z-axis direction, and rotates around the direction along the optical axis 52Bj when the arm parts 21 are moved in the Yθ-direction.

Note that, though illustration has been omitted in FIGS. 7A and 7B, the holding part jig 10 and the supporting part jig 20 are also respectively provided in the optical device main bodies 500 for R-light, G-light, and have the same configurations as those of the holding part jig 10 and the supporting part jig 20 provided for B-light.

Here, returning to FIG. 6, the method of adjusting the location of the liquid crystal light valve 52 after step S3 will be explained.

First, the cross dichroic prism 41 assembled at step S1 is placed in a predetermined location on an adjustment stage. On the adjustment stage, a projection lens for adjustment is provided.

Then, the holding part jig 10 is operated, and the lower side end parts of the fixing plate 62 in the optical device main body 500 are grasped by the pair of grasping parts 11, 12 (see FIGS. 5A and 5B).

Then, the grasping parts 11, 12 are moved and the optical device main body 500 is placed in a location facing the light incident surface 41A.

Then, while the holding part 6 is grasped by the holding part jig 10, the arm parts 21 of the supporting part jig 20 are moved, and the engagement grooves 211 of the arm parts 21 are engaged with the grooves 721 of the supporting part 7 (step S4: jig engagement step).

Then, the arm parts 21 are moved toward the cross dichroic prism 41 side to press the supporting part 7 and brings the supporting part 7 into contact with the light transmission substrate 55 so that the exiting side polarizer 54 may be located in the opening part 711 of the supporting part 7.

Under the condition, the supporting part 7 and the light transmission substrate 55 are in close contact with each other via an uncured UV adhesive.

The supporting part 7 and the light transmission substrate 55 are brought in close contact via uncured UV adhesives for the optical device main bodies 500 for the other two color lights in the same manner.

Then, the holding part jig 10 and the supporting part jig 20 are operated to adjust the locations of the respective liquid crystal light valves 52 (focus adjustment and alignment adjustment) at two steps.

First, as the first adjustment, the focus adjustment of the liquid crystal light valve 52 held by the holding part 6 is performed by moving the grasping parts 11, 12 as will be described below (step S5: first adjustment step).

That is, luminous flux is output from a light source device for adjustment (not shown) toward the liquid crystal light valve 52. Then, while an image for focus adjustment formed by modulation in the liquid crystal light valve 52 and projected on the screen via the exiting side polarizer 54, the cross dichroic prism 41, and the projection lens 36 is checked, the grasping parts 11, 12 are moved so that the image may be focused.

Specifically, the grasping parts 11, 12 are moved in the Y-axis direction, the Xθ-direction, and the Zθ-direction. Concurrently, the holding part jig 10 grasps the holding part 6 and the supporting part 7 is supported by the supporting part jig 20 and pressed against the cross dichroic prism 41. Accordingly, when the grasping parts 11, 12 are moved in the Y-axis direction, the holding part 6 moves in the Y-axis direction while sliding on the respective projection parts 73 via the respective insertion holes 62H. Further, when the grasping parts 11, 12 are moved in the Xθ-direction and the Zθ-direction, the holding part 6 moves in the Xθ-direction and the Zθ-direction between spaces between the respective projection parts 73 and the respective insertion holes 62H with respect to the supporting part 7.

The focus adjustment of the liquid crystal light valve 52 is performed for the optical device main bodies 500 for the other two color lights in the same manner.

Then, after step S5, an ultraviolet ray is applied to the UV adhesives applied between the respective projection parts 73 and the respective insertion holes 62H to cure the UV adhesives, and thereby, the holding part 6 is fixed to the supporting part 7 (step S6: first fixing step).

Then, as the second adjustment, grasping of the holding part jig 10 with respect to the holding part 6 is released and the arm parts 21 of the supporting part jig 20 are moved, and thereby, the alignment adjustment of the liquid crystal light valve 52 with respect to the cross dichroic prism 41 is performed (step S7: second adjustment step).

That is, luminous flux is output from the light source device for adjustment toward the liquid crystal light valve 52. Then, while an image for alignment adjustment formed by modulation in the liquid crystal light valve 52 and projected on the screen via the exiting side polarizer 54, the cross dichroic prism 41, and the projection lens 36 is checked, the arm parts 21 are moved so that the locations of the respective corresponding pixels of the respective liquid crystal light valves 52 may coincide with one another.

Specifically, with reference to the liquid crystal light valve 52 for G-light, the arm parts 21 of the supporting part jig 20 corresponding to R-light and B-light are moved in the X-axis direction, the Z-axis direction, and the Yθ-direction.

Then, when the arm parts 21 are moved in the X-axis direction, the Z-axis direction, and the Yθ-direction, the supporting part 7 moves to follow the movement of the arm parts 21 while sliding on the light transmission substrate via the uncured UV adhesive. The liquid crystal light valve 52 held by the holding part 6 is moved in the above directions and its location is adjusted because the holding part 6 is fixed to the supporting part 7 at the first fixing step.

After step S7, an ultraviolet ray is applied to the UV adhesive between the supporting part 7 and the light transmission substrate 55 to cure the UV adhesive, and thereby, the supporting part 7 is fixed to the cross dichroic prism 41 via the light transmission substrate 55 (step S8: second fixing step).

In this manner, the locations of the liquid crystal light valves 52 for the respective color lights are adjusted in the six axis directions (X-axis direction, Y-axis direction, Z-axis direction, Xθ-direction, Yθ-direction, Zθ-direction). Further, the optical device 4 is manufactured at the steps S1 to S8.

As described above, according to the embodiment, the following advantages may be obtained.

(1) The optical device 4 includes the holding part 6 and the supporting part 7 formed as described above, and thus, the optical device 4 that may adjust the locations of the respective liquid crystal light valves 52 with high accuracy, i.e., may suppress the pixel shift while realizing the simple configuration and downsizing may be provided.

(2) The optical device 4 may have a configuration in which spaces are secured among the respective optical device main bodies 500 because the optical device main body 500 is formed to be compact in the horizontal direction.

Further, in the projector 1 including the optical device 4, spaces are secured between the respective optical device main bodies 500 and between the projection lens 36 to be moved by the lens shift mechanism 35 and the optical device 4, and the interference between the members due to an impact of drop or the like is suppressed. Therefore, the projector 1 that may suppress the pixel shift for the impact of drop or the like and project high-quality images may be provided.

(3) The grooves 721 as the locking parts are provided on both sides of the liquid crystal light valve 52, and the supporting part 7 may be stably locked by the supporting part jig 20. Therefore, the work of the second adjustment step etc. may be efficiently performed.

(4) The locking part is the V-shaped groove 721, and thus, the first slope 721U and the second slope 721D may be formed in the smaller spaces with high accuracy.

(5) According to the simple configuration in which the grasping parts 11, 12 that can grasp the holding part 6 are provided in the holding part jig 10 and the arm parts 21 having the engagement grooves 211 are provided in the supporting part jig 20, the adjustment jigs may be simplified.

(6) According to the method of manufacturing the optical device 4 of the embodiment, the location of the liquid crystal light valve 52 is adjusted at two steps, and thus, the adjustment in the directions in which adjustment has not been completed at the first adjustment step (X-axis direction, Z-axis direction, and Yθ-direction) may be performed. Further, when the grasping of the holding part jig 10 with respect to the holding part 6 is released, even if the location is shifted in the X-axis direction and the Z-axis direction, the adjustment may be performed at the second adjustment step. Therefore, the good optical device 4 with suppressed pixel shift may be manufactured.

Modified Examples

Note that the embodiment may be changed as below.

In the embodiment, the number of grooves 721 provided as the locking parts is four, however, the number may be another than four. For example, of the pair of extending parts 72, two grooves 721 may be formed in one extending part and one groove 721 may be formed in the other extending part 72.

The locking part is not limited to the V-shaped part. For example, the part between the upper and lower grooves 721 in the extending part 72 may be eliminated and the locking part may be formed by the first slope 721U of the upper groove 721 and the second slope 721D of the lower groove 721.

The optical device 4 of the embodiment includes the light transmission substrate 55, however, the device may have a configuration without the light transmission substrate 55.

The supporting part 7 of the embodiment is formed from the metal plate material, however, the part may be formed by molding of a melted metal in a die.

The projector 1 of the embodiment uses the transmissive liquid crystal light valve 52 as the light modulator, however, the projector may use a reflective liquid crystal light valve.

The light source 311 is not limited to the discharge lamp, but may be another type of lamp or a solid light source such as a light emitting diode.

The entire disclosure of Japanese Patent Application No. 2012-173753, filed Aug. 6, 2012 is expressly incorporated by reference herein.

What is claimed is:

1. An optical device comprising:
a plurality of light modulators modulating a plurality of incident color lights with respect to each color light;
a light combining optical unit having a plurality of light incident surfaces that the plurality of modulated color lights respectively enter, and combining the plurality of entering color lights;
a holding part holding the light modulator; and
a supporting part loosely fitting and supporting the holding part, and disposed in a location facing the light incident surface of the light combining optical unit,
wherein
the supporting part has an extending part extending in a direction away from the light incident surface,
a locking part is formed in a v-shaped groove in which a first slope and a second slope intersect in an extension direction and face each other, and
the locking part is provided in an end part in the extension direction of the extending part.

2. The optical device according to claim 1, wherein the extending part is provided at a side of the light modulator, and
at least a part of the locking part projects past a light incident side of the light modulator in a direction away from the light incident surface of the light combining optical unit.

3. The optical device according to claim 2, wherein
the extending part includes two extending parts provided in locations corresponding to both sides of the light modulator, and
the locking parts are respectively provided in the two extending parts.

4. The optical device according to claim 1, wherein
the holding part has a plurality of insertion holes,
the supporting part has a plurality of projection parts at end parts extending in a direction away from the light incident surface of the light combining optical unit and supporting the holding part by being respectively inserted into the plurality of insertion holes, and
a first projection part and a second projection part of the plurality of projection parts extend in different directions from each other on a plane orthogonal to an optical axis of the color light entering the light modulator held by the holding part.

5. A projector comprising:
a light source;
the optical device according to claim 1; and
a projection lens that projects light combined in the optical device.

6. A projector comprising:
a light source;
the optical device according to claim 2; and
a projection lens that projects light combined in the optical device.

7. A projector comprising:
a light source;
the optical device according to claim 3; and
a projection lens that projects light combined in the optical device.

8. A projector comprising:
a light source;
the optical device according to claim 4; and
a projection lens that projects light combined in the optical device.

9. A method of manufacturing the optical device according to claim 1, comprising:
engaging a second jig with the locking part under a condition that the holding part loosely fitted and supported by the supporting part is grasped by a first jig;
adjusting a location of the light modulator held by the holding part by moving the first jig;
fixing the holding part to the supporting part;
adjusting the location of the light modulator by releasing the grasping of the first jig with respect to the holding part and moving the second jig; and
fixing the supporting part to the light combining optical unit.

10. A method of manufacturing the optical device according to claim 2, comprising:
engaging a second jig with the locking part under a condition that the holding part loosely fitted and supported by the supporting part is grasped by a first jig;
adjusting a location of the light modulator held by the holding part by moving the first jig;
fixing the holding part to the supporting part;
adjusting the location of the light modulator by releasing the grasping of the first jig with respect to the holding part and moving the second jig; and
fixing the supporting part to the light combining optical unit.

11. A method of manufacturing the optical device according to claim 3, comprising:

engaging a second jig with the locking part under a condition that the holding part loosely fitted and supported by the supporting part is grasped by a first jig;

adjusting a location of the light modulator held by the holding part by moving the first jig;

fixing the holding part to the supporting part;

adjusting the location of the light modulator by releasing the grasping of the first jig with respect to the holding part and moving the second jig; and fixing the supporting part to the light combining optical unit.

12. A method of manufacturing the optical device according to claim 4, comprising:

engaging a second jig with the locking part under a condition that the holding part loosely fitted and supported by the supporting part is grasped by a first jig;

adjusting a location of the light modulator held by the holding part by moving the first jig;

fixing the holding part to the supporting part;

adjusting the location of the light modulator by releasing the grasping of the first jig with respect to the holding part and moving the second jig; and fixing the supporting part to the light combining optical unit.

13. The optical device according to claim 1, wherein the second slope extends in a direction intersecting with an extension direction of the first slope in a location facing the first slope.

14. The optical device according to claim 1, wherein the first slope is furthest from the second slope at a location on the extending part that is furthest from the light incident surface.

15. The optical device according claim 1, wherein
the supporting part is processed from a plate, and
the locking part penetrates along the plate thickness and is formed as a cutout.

* * * * *